Nov. 7, 1950     A. W. STEINBERGER     2,529,111
CONTROL FOR WELDING MACHINES

Filed Feb. 19, 1947     4 Sheets-Sheet 3

Inventor
Arthur W. Steinberger
By Godfrey B. Speir
Attorney

Nov. 7, 1950 — A. W. STEINBERGER — 2,529,111
CONTROL FOR WELDING MACHINES
Filed Feb. 19, 1947 — 4 Sheets-Sheet 4

Inventor
Arthur W. Steinberger
By Godfrey B. Speir
Attorney

Patented Nov. 7, 1950

2,529,111

UNITED STATES PATENT OFFICE 2,529,111

CONTROL FOR WELDING MACHINES

Arthur W. Steinberger, Elizabeth, N. J., assignor to Curtiss-Wright Corporation, a corporation of Delaware Application February 19, 1947, Serial No. 729,526

15 Claims. (Cl. 219—8)

1

This invention concerns control systems in general, and relates particularly to an electrical control system for a variable mechanism wherein variations in a condition of the mechanism are compared with a reference, and wherein errors sensed by such comparison are applied to the mechanism for correction.

While the principles of the invention may be applied to a great variety of mechanisms, it is particularly applicable to the control of welding current in a system for submerged melt welding or other kinds of electrical welding and, in fact, the system was developed for use in the control of a particular type of welding equipment. As it relates to welding current control, the invention is applicable to adjust a welding current transformer to maintain the welding current constant or to vary it over a predetermined schedule. The actual welding current is sensed and converted to a direct current voltage which varies substantially in proportion to the welding current. This variable voltage is compared to a reference voltage in an electronic tube system which produces an error signal representing a demand for an increase or a decrease in welding current over that existing at the instant of the signal. These signals are amplified and are used for the adjustment of the welding current transformer either to increase or decrease its current output so that within the sensitivity limits of the system the average current remains constant or at a value consonant with a predetermined welding current schedule.

So-called constant current welding transformers or generators for welding produce roughly regulated average current values adaptable for the fabrication of articles where very finely regulated current control is not mandatory. In the manufacture of hollow steel propeller blades, however, the utmost perfection in technique is required, and the current schedule must be closely regulated and varied from point to point on a determinate schedule as a welding pass proceeds. The quality of the weld must necessarily be high since the ultimate propeller blade is highly stressed in operation; the blade must be of minimum weight, and welded joints must be of perfect character and uniformity so that high stress points are inhibited, and so that incipient cracks and flaws in the welds be minimized. In the automatic welding of propeller blades it was essential to develop welding control methods which were superior to those available, as existing control methods produced an unsatisfactory product.

It will be clear as the description proceeds that

2 the principles of the invention may be utilized for current control of other apparatus than welding systems and further, that the principles of the invention may be used for the control of variables other than electrical current.

An object of the invention is to provide a comparator type of control system whereby a variable quantity may be compared with a reference quantity and whereby the differences between the two quantities are converted to error signals which may be impressed upon mechanisms capable of effecting correction of the controlled quantity. A further object of the invention is to provide a system for securing precise control of electric welding current. Another object of the invention is to provide an electronic circuit system for control of a variable quantity. A further object of the invention includes the provision of a practicable control system which may be applied to automatic submerged melt welding machines and a related object is to provide a current control system wherein the current density may be varied over a predetermined schedule during a welding operation, with the assurance that the welding current applied to the weld will be in exact conformance with a prearranged schedule. Still another object is to provide means for varying the controllable quantity over a predetermined schedule either with respect to time or with respect to the progress of a process step such as a welding pass along a workpiece. A further object is to provide a control system which is not only highly sensitive and close in regulation, but which is of such simple and direct nature as to have few service difficulties and substantial longevity and freedom from failure.

Further objects of the invention will become apparent in reading the annexed detailed description in connection with the drawings. The description and drawings, however, are not to be construed as limiting the scope of the invention, the limits of the invention being defined in the annexed claims.

In the drawings, wherein similar reference characters indicate similar parts, Fig. 1 is a schematic diagram of a control system;

Figure 2:
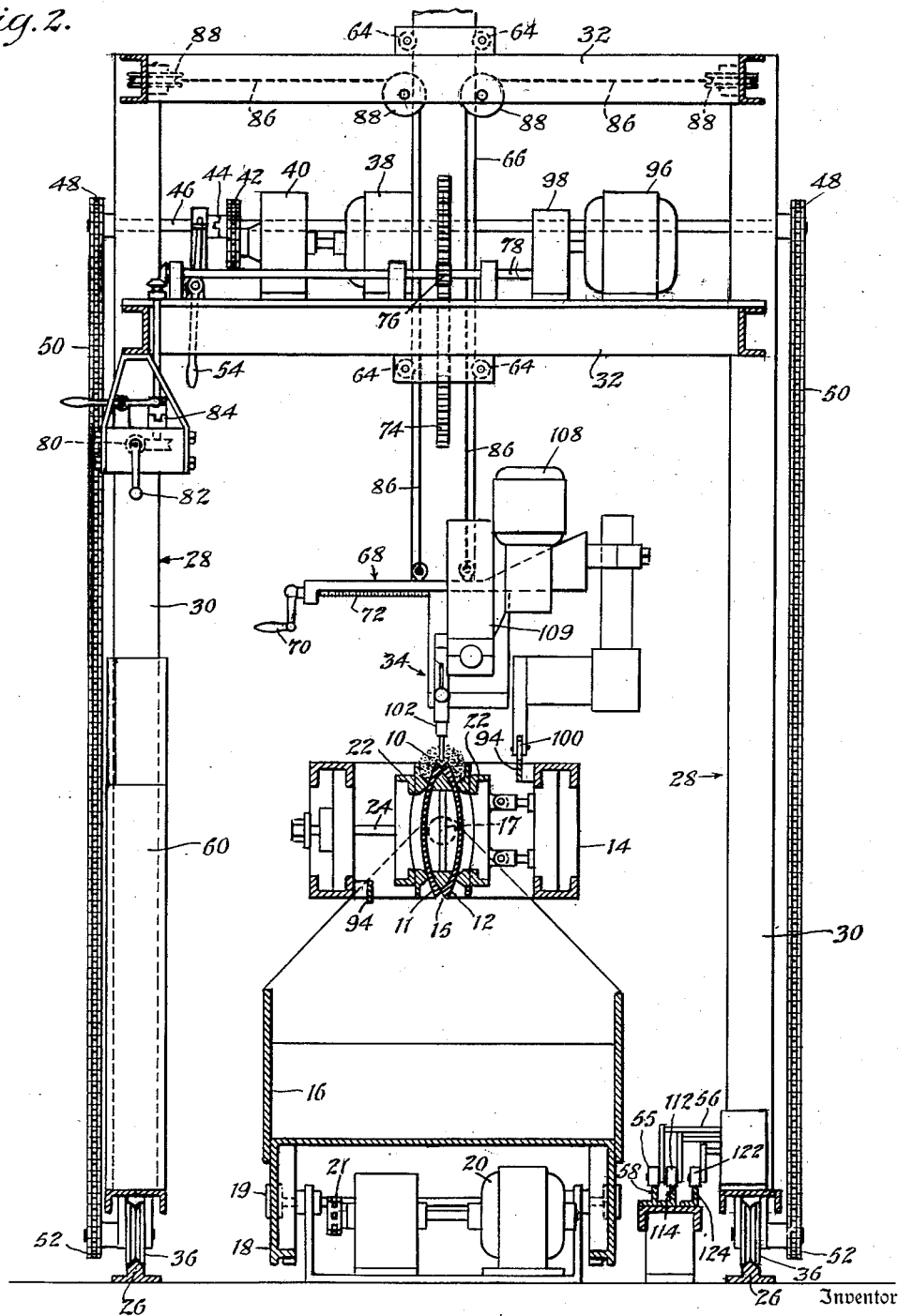
Fig. 2 is an end elevation partly in section of an automatic welding machine with which the control system is adapted to be used.
Figure 3:
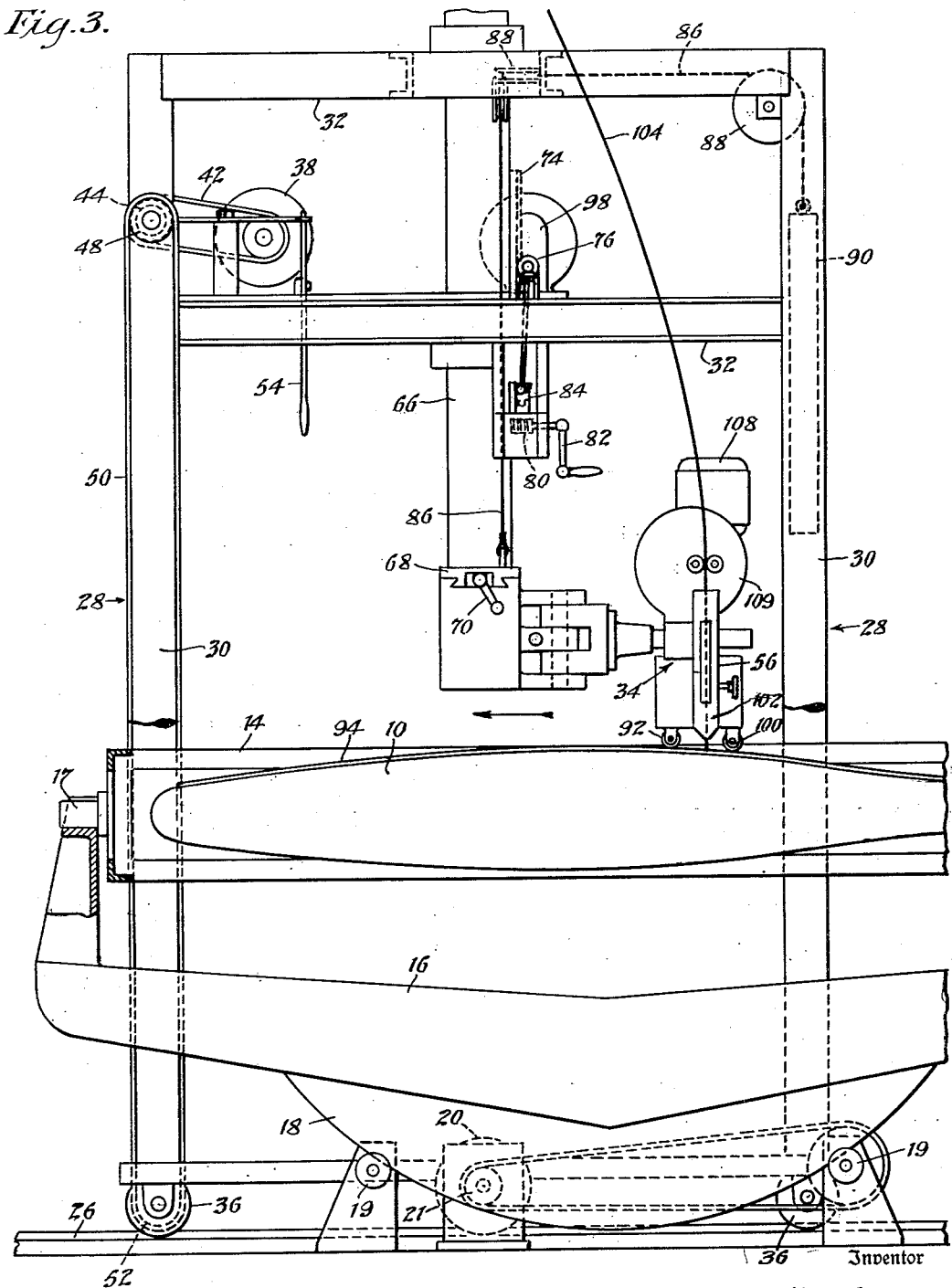
Fig. 3 is a side elevation, partly broken away, of the welding machine.
Figure 4:
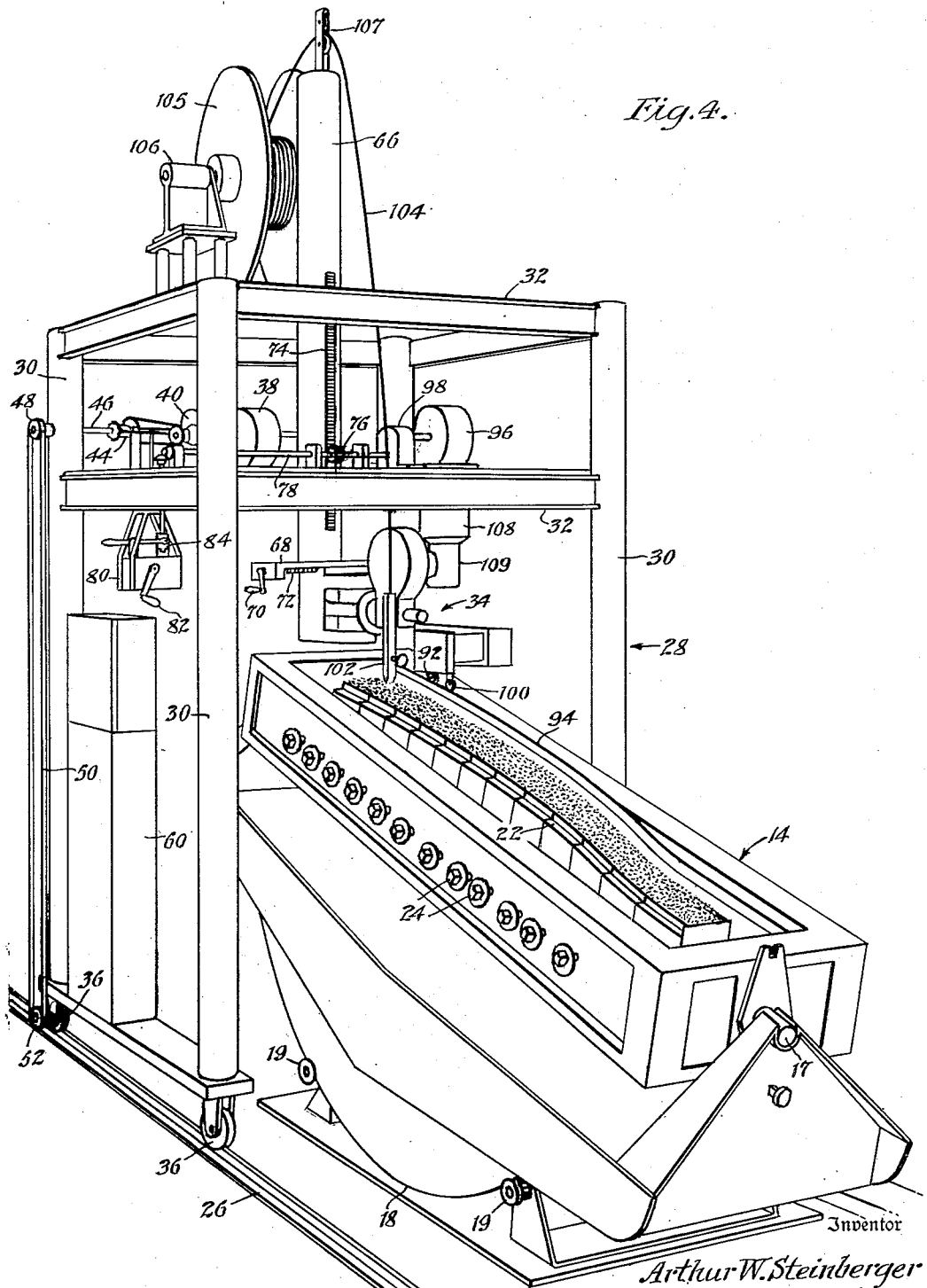
Fig. 4 is a perspective elevation of the welding machine.

Reference may first be made to Figs. 2, 3 and 4 for visualization of an environment in which the control system is adapted for use. A propeller blade 10 is shown as the workpiece upon which a welding operation is to be performed. The blade comprises two substantially similar halves 11 and 12 clamped in facing relation in a work holding fixture 14, to receive welding metal at the joining edges 15 to unite the blade halves 11 and 12 into an integral whole. In practice, the planform of the propeller blade is variously curved and the thickness of the material varies from the blade tip to the blade root to secure the desired weight and stress distribution in the assembly. It has been found essential in welding such blades to vary the welding current, the welding speed, and the welding voltage throughout a welding pass from tip to root in order to secure proper weld quality and a smooth, adequate deposit of metal. It is necessary further to tilt the blade in its fixture 14 during a welding pass so that the increment being welded at any one time during the pass will have a predetermined slope with respect to the welding head.

The fixture 14 is carried in a cradle 16 by fixture-holding releasable trunnions 17 which allow inversion of the fixture for welding opposite blade edges, and removal of the fixture for loading and unloading if desired. The fixture 14 is provided with appropriate rams, anvils, and adjustments to enable expeditious removal and assembly of workpieces therein. The anvils are indicated at 22 and the rams at 24. The cradle includes arcuate tracks 18 resting on rollers 19, certain of said rollers comprising pinions driven by a controllable reversible electric motor 20 whereby the tilt of the blade 10 may be altered as desired during the welding pass.

Along each side of the cradle 16 are parallel tracks 26 on which a gantry or carriage 28 may travel. The gantry comprises corner posts 30 extending vertically well above the cradle 16 and fixture 14, and these posts are bridged at their upper ends by a structure 32 carrying a welding head 34 and its associated structure to be described. Each post 30 has a track engaging roller 36 journalled at its lower end in order that the gantry 28 may travel longitudinally on the tracks to enable the welding head 34 to pass over the full length of the fixture 14.

On part of the structure 32, a motor 38 is mounted to drive a shaft 46 through a reduction gear 40, a chain 42 and a clutch 44, the shaft 46 having sprockets 48 at its ends outboard of the posts 30. From the sprockets 48, chains 50 are run to engage sprockets 52 drivably engaged with two of the track engaging rollers 36. The clutch 44 is manually controllable by a lever 54 to disconnect the driving motor from the wheels 36. The travelling motor 38 is reversible, variable in speed, and is automatically controlled as to direction of rotation and speed, by means well known to those familiar with the art, such means including a cam follower 55 swingably mounted on the gantry on a shaft 56 and engaging a fixed cam track 58 lying parallel to one of the tracks 26. Alternatively, other cam arrangements or controls may be used to secure a predeterminate carriage speed schedule. Appropriate manually operable motor starting means are provided in a control panel 60, Fig. 4, mounted on one of the sills of the gantry, such controls providing forward, return and stop motor positions at constant speed as well as an automatic travelling connection whereby the travelling motor 38 may be controlled by the cam track 58.

The gantry structure is provided with guides 64 for a vertically movable ram 66, upon the lower end of which is a transverse track 68 holding the welding head 34 and associated mechanism. Transverse adjustment of the head assembly may be accomplished manually by a crank 70 operating on a screw 72 engaging an appropriate nut in the welding head assembly. The vertical ram 66 is provided with a rack 74 engaged by a pinion 76 on a shaft 78 borne by the gantry, said shaft being turned, through a gear mechanism 80, by a hand crank 82 to enable manual adjustment of the ram. The hand crank 82 is declutchable as at 84 from the shaft 78 to allow automatic vertical travel of the ram. The ram and its associated welding head are counterbalanced through cables 86 passing over sheaves 88, the cable supporting counterweights 90 of sufficient weight to almost balance the ram and head structure. To control vertical movement of the head during automatic welding, the welding head structure 34 is provided with a cam follower 92 riding on a cam 94 rigidly secured to the work holding fixture 14. As the gantry travels over the fixture during an automatic welding pass, the elevation of the welding head is precisely controlled since the head follows the profile of the cam 94 which is predetermined in shape to secure proper elevation of the head from the workpiece at all stations therealong.

If desired, the elevation of the ram and head may be accomplished by power means such as the motor 96 on the upper part of the gantry driving the pinion shaft 78 through a reduction gear 98. Control of the motor 96 as to its elevating and depressing direction and as to its speed may be accomplished by an appropriate motor control, known to those familiar with the art, which is actuated by the bearing of the cam follower 92 on the cam 94.

Reference was previously made to the motor 20 beneath the cradle 16 which tilts the work fixture 14. The motor 20 is provided with a direction and speed controller, well known to those familiar with the art, and this speed controller is actuated by a tilt control cam follower 100 lying adjacent the cam follower 92 and bearing on the cam 94. The follower 100 is so arranged as to initiate forward or rearward tilt of the carriage, through the motor 20, to maintain that portion of the workpiece lying beneath the welding head in a substantially level attitude or in a slightly tilted attitude to enable proper flow of weld metal onto the welded joint.

Figure 1:
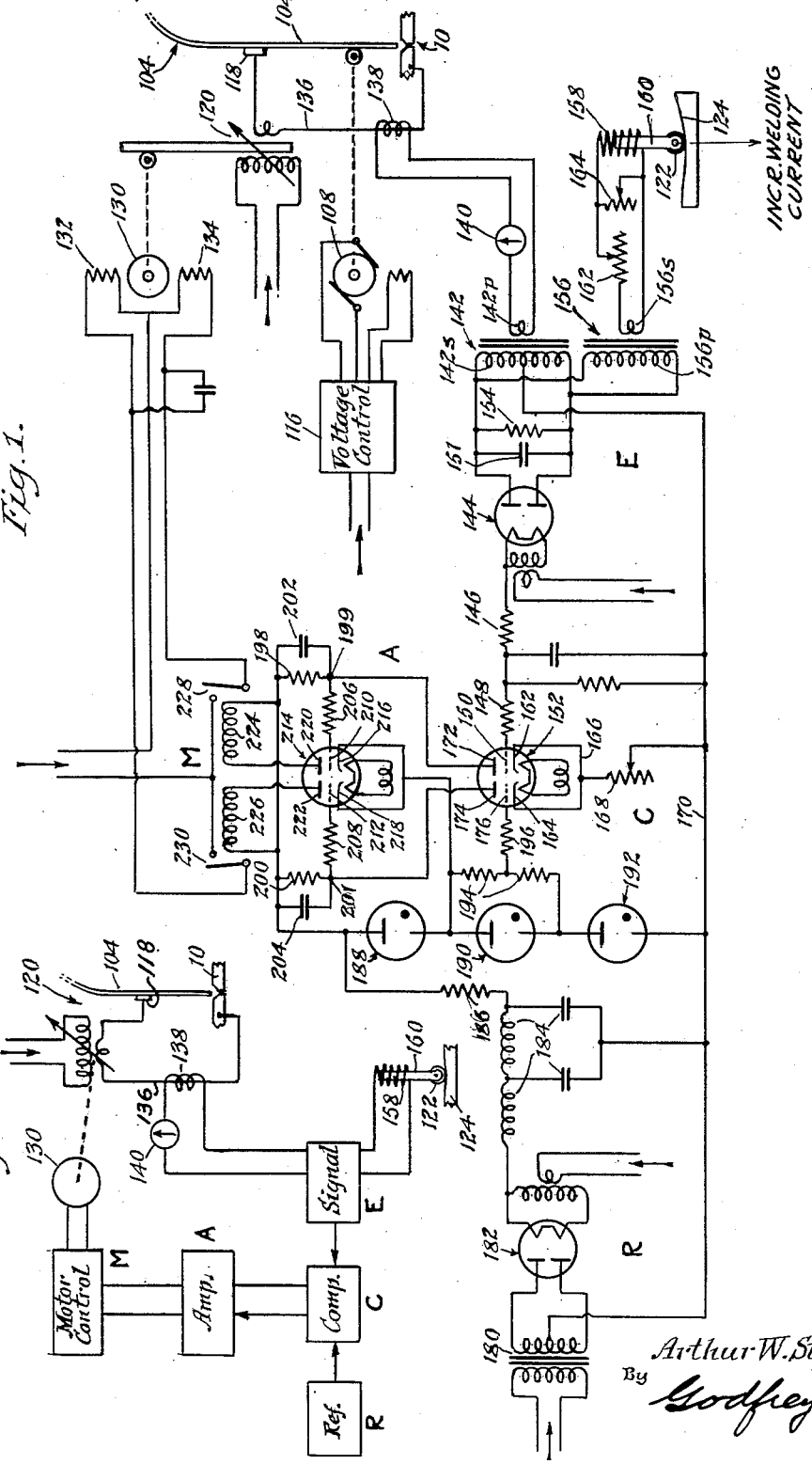
Fig. 1a is a block diagram of the control system.

The welding head 34 includes a welding rod guide 102 fed by welding rod 104 from a supply reel 105 journalled as at 106 on the top of the gantry, the welding rod running from the reel through sheaves 107 on the top of the ram 66 downwardly to the welding head. The welding head further includes a variable speed rod feed motor 108, connected through suitable mechanism 109 to rod feed rolls by which the rod 104 may be fed through the head at an appropriate rate for the welding operation. Control of the rod feed motor speed is afforded through an automatic voltage control system, not detailed, actuated by a cam follower 112 on the gantry engaging a voltage control cam track 114 disposed in parallel relation to the speed control cam track 58 and the rail 26. The voltage control system is indicated in Fig. 1 by a box 116, and comprises another invention covered in a separate application.

Welding current is supplied to the welding rod through a shoe 118 (Fig. 1) comprising part of the welding head structure 34 and welding current is provided by a variable transformer 120 (Fig. 1) controlled, by means to be described, from a current control cam follower 122 (Figs. 1 and 2) adjacent the cam followers 54 and 112, engaging a current control cam track 124 (Figs. 1 and 2) parallel to and adjacent cam tracks 58 and 114.

By the above described control cams and control means and motors, it will be seen that the welding head is caused to travel relative to the work to be welded at any desired variable or constant speed, that the tilt of the workpiece is at all times controlled with respect to the welding head, and that the spacing of the welding head with respect to the workpiece may be maintained at a predetermined amount. The several cams 58 and 94 will be so profiled as to control operation of the several means and electric motors in the desired manner. For any particular type or model of propeller blade to be welded, there may be a different set of cams in order that welding speed and position may be precisely controlled to secure optimum welds. The elevation control of the welding head, the tilting of the cradle 16 and the longitudinal travel of the carriage 28 may be achieved by means other than electric motors and cam follower controls having electrical control effects on the motors. For instance, these motions may be secured by a hydraulic, pneumatic, or mechanical means and the choice of the motor means will be largely a matter of engineering judgment depending upon the complexity of the motions involved for a particular type of workpiece. For steel propeller blade manufacture, electrical controls have been found most flexible, fast in response, and adaptable.

The important controls imposed on the welding apparatus to attain uniform and high quality welds are control of current and control of voltage. Current control is afforded by varying the output of the welding current supply source, which may comprise a transformer having a moving coil arrangement or a moving core arrangement, or some known form of variable output generator. Voltage control is attained primarily by controlling the rate of rod feed to the weld. As welding rod fuses and the gap between the weld and rod increase, the voltage increases, while if the rate of melt is less than the rate of rod feed the voltage decreases. Precise control of voltage according to a predetermined schedule, and precise control of current, are both essential in securing high quality welds with the appropriate amount of weld metal deposition in accordance with the section to be built up, thickness of the material being welded, and the speed of the welding head relative to the work.

In prior current and voltage controls, deliberate changes of current or of voltage are accompanied respectively by voltage or current changes. It is important that uniformity of current and voltage according to their own schedules be maintained independently of one another—interaction of current and voltage from change of one is undesirable as it lowers weld quality. There are various types of independent voltage controls and one of these will be covered in a co-pending application. This application deals particularly with independent current controlling means to maintain welding current either uniform, or variable over a predetermined cam controlled schedule.

As previously stated, variation in the current output of the welding transformer 120 is afforded by a movable core or alternatively by a moving coil. Variation of this instrumentality for current adjustment is accomplished by a reversible motor 130 (Fig. 1) having increase current and decrease current field windings 132 and 134. The motor 130 is preferably of the dynamically braked type so that current controlling movements will be precise, fast, not subject to overrun and will occur only when the motor is energized.

The heart of the current controlling system is shown in the block diagram of Fig. 1a and in the schematic diagram of Fig. 1. In Fig. 1a, it will be noted that one of the secondary leads is connected to the feed shoe 118 from the transformer 120 while the other, 136, forms a primary of a current transformer 138 and then connects to the workpiece. The output of the transformer 138 connects through a welding current indicating ammeter 140 to a current signal producing circuit E. This feeds a current signal to a comparator circuit C which is also fed with a reference signal R, the comparator sensing a plus or minus difference between the current signal and the reference and feeding the distinguished error signal to an amplifier system A. The amplifier passes an augmented error signal to the motor control M which in turn actuates the motor 130 to alter the transformer 120 for welding current adjustment.

The several components E, C, R, A, and M in Fig. 1a may be of any suitable type as to details. One specific circuit arrangement is shown in Fig. 1. Herein, the output from the current transformer 138 is connected to the primary (142p) of a high reactance transformer 142 whose secondary arm 142s provides voltage which varies with fluctuations in welding current and thereby provides a signal from which current errors from the desired value may be detected. The alternating current output from this transformer is rectified in a two wave rectifier 144 connected through resistors 146 and 148 to the comparator unit comprising a dual triode 152. In the signal rectifier circuit is included a resistor 154 of the type wherein resistance decreases with a voltage rise, along with a condenser 151, these elements protecting the rectifier circuit against signal voltage surges.

The secondary 142s is shunted by the primary 156p of a transformer 156 whose secondary 156s is provided with a load in the form of an inductor 158, the latter including a movable core 160 actuated by the current control cam follower 122 and the current control or schedule cam 124 which serve to vary the inductance and thus to vary the load on the transformer 156. Series and shunt adjustable resistors 162 and 164 are included in the circuit of 156s and 158 as a means for adjusting the maximum and minimum load on the transformer between which the variable inductance 158 is effective. The transformer 156 with its variable secondary load acts as a correspondingly variable load on the secondary 142s of the transformer 142, thus establishing control of voltage in the circuit of the rectifier 144 which will be in conformance with a desired welding current schedule. This voltage will be of a value, when the precisely desired welding current is flowing, to impose a definite voltage on the grid 150 of the tube 152.

In general, a dual control is imposed on the reference potential applied to the grid 150, namely a primary control that functions according to the actual load or welding current as represented by transformer 138, and a scheduled current or rate control that in the present instance functions according to the relative position of the welding head along the workpiece as represented by the follower 122 and schedule cam 124. Specifically, the welding current is varied so as to deposit the amount of metal needed according to a predetermined schedule at any particular point or region of the workpiece. The two controls jointly affect the potential on grid 150 in such manner that the resulting control operation tends to restore the grid potential to its normal or reference value where no control operation is induced.

The dual triode 152 comprises cathodes 162 and 164, interconnected as at 166, the common cathode return passing through a variable resistor 168 to the lead 170 which is the common zero potential bus for all of the electronic control circuits. The cathode 162 is associated with the grid 150 and provides an electron stream for a plate 172. The cathode 164 provides an electron stream for a plate 174, the latter cathode and plate being associated with a grid 176 upon which is impressed a fixed reference voltage.

A reference and plate voltage supply is provided by a transformer 180 whose output is rectified by a two-wave rectifier 182, the rectified output being smoothed out by a choke and condenser system 184 familiar to those versed in the art. The positive plate voltage supply is carried through a limiting resistor 186 to the plate of a voltage regulator tube 188 connected in series with additional voltage regulator tubes 190 and 192, the cathode of the tube 192 being connected to the common return 170. These voltage regulator tubes may be of any appropriate type such as glow discharge, and afford a means for selecting reference voltages and plate voltages for the control system. A voltage divider 194 across the voltage regulator 190 provides a reference potential for the grid 176 through a protective resistor 196. Plate voltage for the plates 172 and 174 is provided from the plus side of the voltage regulator 188 through load resistors 198 and 200, these resistors being shunted by capacitors 202 and 204 to introduce a time lag into the plate circuit.

When no error signals are being sensed by the comparator dual triode 152, the grids 150 and 176 are equally biased at the reference potential so as to pass a small plate current from the cathodes to the respective plates 172 and 174, the resistor 168 providing an additional joint part of the plate circuits as well as raising the normal voltage of the cathodes to a positive value above the potential of the return 170, such value being close to the potential existing at the grids 150 and 176.

When a positive voltage increase is impressed on the grid 150 by virtue of a current change in the welding circuit, as sensed through the transformer 138 and transmitted through the transformer 142 and its associated rectifier, current from cathode 162 to plate 172 in the right hand side of the comparator triode 152 will increase. Thus the voltage drop across the resistors 198 and 168 in the plate circuit of the tube will increase and the voltage level at the cathodes 162 and 164 will be made more positive with relation to the grid 176. This diminishes the plate current from the cathode 164 to the plate 174 decreasing the voltage drop across the resistor 200.

Conversely, if a negative voltage error signal is impressed on the grid 150, plate current from the cathode 162 to the plate 172 will be reduced. Concurrently, the reduction in plate current will render the cathodes 162 and 164 more negative in relation to grid 176 by virtue of the decrease in drop across the common resistor 168, whereby plate current is increased from the cathode 164 to the plate 174. The resistor 168 is made variable for adjustment of the sensitivity of the comparator tube to error signals.

The plates 172 and 174 of the comparator tube 152 are direct coupled through grid resistors 206 and 208 to grids 210 and 212 of a dual triode amplifier 214 having interconnected cathodes 216 and 218 respectively and having plates 220 and 222 respectively. The tube 152 is direct coupled to tube 214 by virtue of resistors 200 and 198 which are common to the plate circuits of tube 152 and the grid circuits of tube 214. The interconnected cathodes 216 and 218 connect with the negative side of the voltage regulator 188 while the plates 220 and 222 are connected to the positive side of the voltage regulator 188 through actuating coils 224 and 226 respectively of relays having contactors 228 and 230 respectively. The tube 214 serves only as a signal amplifier and when the system is in balance its grids are at such a potential with respect to its cathodes as to substantially cut off current in both plate circuits. If either grid 210 or 212 is rendered more positive, as will be described shortly, the corresponding side of the tube will pass sufficient plate current to energize the respective relay coils 224 or 226 to close the respective relay contactors 228 or 230.

The contactors 228 and 230, when closed, respectively energize the field windings 134 or 132 of the current control motor 130 to cause operation thereof for welding current decrease or increase until corrective action is accomplished. Full corrective action will relax the error signal to the comparator tube and will allow the motor relay to open, causing immediate stoppage of the current control motor 130 by virtue of its dynamic braking characteristic.

From a plus voltage error signal on the grid 150, the current increases in the circuit of the plate 172 causing an increased voltage drop across the loading resistor 198 (point 199) and rendering this point more negative than before. This point is connected to the grid 210 of the amplifier so that this side of the amplifier remains, by virtue of the continuing negative grid voltage, at cut off. When the grid 150 went more positive it will be recalled that grid 176 went more negative, reducing current to the plate 174 and through the load resistor 200. This decreases the drop across the resistor 200, making the voltage at point 201 more positive. Since point 201 connects to the amplifier grid through the grid resistor 208, the grid 212 is rendered more positive, passing current to the amplifier plate 222 and its load coil 226. Thus, a positive signal on the comparator tube grid 150 adjusts the grid 212 of the amplifier above cut off to energize the relay coil 226. Conversely, a negative error signal on the grid 150 decreases the voltage on the amplifier grid 212 and increases the voltage on the amplifier grid 210, adjusting the grid 210 above cut off to allow plate current to energize the relay coil 224.

Accordingly, the dual control tends to seek a stable condition represented by the reference potential on grid 176. When the welding schedule or program changes so that a higher welding current for example is desired, the cam follower 122 moves to a comparatively low point on the cam 124 thereby increasing the inductance of inductor coil 158 which in turn causes through the loading transformer 156 decrease of the voltage across the secondary winding 142s of the grid control transformer 142. Consequently, the rectified voltage applied to grid 150 is also decreased. This negative voltage signal as previously explained causes energization of relay coil 224 and operation of the current control motor 130 in a direction to increase the current output of welding transformer 120, thereby also increasing the output of the sensing current transformer 138. As a result the voltage across the secondary winding 142s is increased thus tending to raise the potential on grid 150 back toward the reference value where it is stabilized when the welding current corresponds to the new program value.

It will be noted that the amplifier cathodes 216 and 218 operate at a potential well above that existing in the common return 170 and that the amplifier grids 210 and 212, when the system is in balance, operate at a potential determined by the voltage drop across the load resistors 198 and 200 from the maximum plate voltage available. Circuit constants are so selected that the grid-cathode voltage in the amplifier tube is such as to hold the tube at cut off as long as the comparator tube is balanced, resulting in both relay contactors remaining open.

It is deemed to be within the scope of one skilled in the art to select electronic tubes appropriate for the fulfillment of the functions above described. In this connection, it is not necessary that the comparator and amplifier tubes be dual—they may comprise single triodes appropriately connected. Further, the proper functioning of the system is not limited to triodes; any other appropriate electronic tubes such as tetrodes or pentodes, gas filled tubes or other devices might be adapted to the system. It is further believed that the selection of circuit constants, voltages, values of resistors, capacitors, inductances and impedances is within the scope of the skilled circuit designer and that considerable latitude may exist in circuit design while still securing the functions and objectives of the invention previously set forth.

In describing the circuit system above, extended functional explanation of some of the more common components has been omitted since it is considered that those skilled in the art will fully comprehend the nature and function of such elements. For instance, no explanation has been detailed as to heater current supply for the rectifiers, comparator or the amplifier tubes since heater provisions in electronic circuits are quite conventional.

By the use of electronic comparator circuits as a control medium for the current transformer, extremely small current errors can be sensed and the control system will tolerate no material current deviations without immediate correction. It has been found that the basic system described has so small a lag in its response that damping means are needed in the circuit to cause welding current deviations to be perceptible on the indicating ammeter 140. The system has the great advantage that current is controlled in response to current errors regardless of how caused. Sensitivity may be set at a practical value to avoid excessive transformer adjustment and relay operation, so long as current fluctuations are suppressed sufficiently to yield the desired weld quality. In usual systems, the welding transformer may be varied according to a certain schedule, without sensing the actual welding current delivered. Such an arrangement, does not respond to current changes induced by voltage fluctuations or extraneous causes.

While the control system of this invention is described as applied to welding current control, it is deemed to be within the scope of the invention to utilize a comparator circuit, such as that disclosed, in a variety of other environments. In effect, any variable mechanism whose variations are convertible to voltage fluctuations may utilize the control system since the voltage variations cause corrective impulses on the mechanism in the desired direction. The present control system may be used for voltage control as well as current control.

In the reference voltage system, the transformer, rectifier and voltage regulator circuits could readily be replaced by other reference voltage producing batteries or other devices. The variable load inductor 158 is capable of alteration from the form shown as is the variable loading system in the secondary of the transformer 142, to enable alteration of circuit characteristics to vary the input from the current transformer.

Control of the desired current schedule on the input signal side of the circuit is desired rather than variation in the reference voltage in order to operate the comparator tube in the optimum portion of its characteristic curve.

Though but a single embodiment of the invention has been illustrated and described, it is to be understood that changes may be made without departing from the spirit or scope thereof, as will be apparent to those skilled in the art. Reference should be had to the appended claims for a definition of the limits of the invention.

What is claimed is:

1. A welding current regulating system comprising means for varying a supply of welding current, means responsive to said current according to the magnitude thereof, means operable according to a welding current schedule, means jointly controlled by said welding current responsive means and said schedule means for selectively producing alternate sense control quantities with respect to a reference value and means controlled thereby according to the sense of a selected control quantity for controlling the supply of said current so as to maintain welding current at the schedule value.

2. A current regulating system comprising means for varying a supply of current, means responsive to said current according to the magnitude thereof, means operable according to a desired current schedule, means jointly controlled by said current responsive means and said schedule means for selectively producing alternate sense control quantities with respect to a reference value and means controlled thereby according to the sense of a selected control quantity for controlling the supply of said current so as to maintain current at the schedule value.

3. In a welding system including controlled means to move a welding head relative to a workpiece, in combination, means to control said moving means to effect welding head movement at a predetermined schedule, a variable welding transformer, means controlled by the position relation of said workpiece and welding head to vary the output of said welding transformer according to said schedule, and means responsive to the welding current and related to said schedule control for maintaining said welding current at the schedule value.

4. In a welding system including controlled means to move a welding head relative to a workpiece, in combination, means to control said moving means to effect welding head movement at a predetermined schedule, a variable current welding transformer, means responsive to the position relationship of said head and workpiece to vary the current of said transformer according to said schedule, and means responsive to the welding current, said schedule responsive means and said welding current responsive means being interrelated so as jointly to control said welding transformer for maintaining the welding current at the schedule value.

5. In an electric welding machine, in combination, a welding head and a relatively movable workpiece, means operable on a predetermined speed schedule to move said head relative to said workpiece, a variable welding transformer, cam and follower means associated with the head and workpiece establishing a desired welding current schedule as said head and workpiece move relatively, means to sense a manifestation of actual welding current, means to bias the sensed current manifestation with a factor resulting from the instant relationship of said cam and follower, a comparison device having a fixed reference against which said manifestation is compared and operable to produce error signals when the reference and manifestation are unbalanced, and means actuated by error signals to vary the current output of said welding transformer.

6. In a welding current regulating system, in combination, a variable current transformer, reversible motor means operatively connected to said transformer to vary the current output of said transformer, an output current sensing device, a reference device, means jointly controlled by said sensing and reference devices arranged to energize said reversible motor, and means to modify the operation of said motor to alter the current output according to a welding current schedule.

7. In a current regulating system, in combination, a variable current transformer, reversible motor means operatively connected to said transformer to vary the current output of said transformer, a signal producing output current sensing device, said signal comprising a voltage manifestation, means to load said device to cause the voltage manifestation to represent differing schedule values of current, a reference voltage, a comparator fed by said voltage manifestation and by said reference voltage, producing a voltage error signal resulting from a difference between said voltage manifestation and said reference voltage, and means responsive to said error signal to actuate said motor means to alter current.

8. In a welding current regulating system, in combination, a variable current transformer, reversible motor means operatively connected to said transformer to vary the current output of said transformer, a signal producing output current sensing device, said signal comprising a voltage manifestation, means to load said device to cause the voltage manifestation to represent differing schedule values of welding current, and means responsive to variations of said voltage manifestation to actuate said motor means to alter welding current, said latter means comprising an electronic tube triggering circuit including welding current increasing circuit elements and welding current decreasing circuit elements respectively energized by voltage manifestations due to low or high welding current.

9. A welding current regulating system comprising means for varying a supply of welding current, means responsive to said current according to the magnitude thereof, means operable according to a welding current schedule, a source of reference voltage, electronic means jointly controlled by said welding current responsive means and said schedule means for selectively producing alternate sense control voltages with respect to said reference voltage and means controlled by said electronic means according to the sense of a selected control voltage for operating said current varying means so as to maintain welding current at the schedule value.

10. A welding current regulating system comprising means for varying a supply of welding current, electromagnetic means energized according to the magnitude of said current for producing a control voltage, electromagnetic means operable according to a welding current schedule for modifying said control voltage, a source of reference voltage, electronic means controlled by said modified control voltage for selectively producing alternate sense control voltages with respect to said reference voltage and means controlled by said electronic means according to the sense of a selected control voltage for controlling the supply of said current so as to maintain welding current at the schedule value.

11. A welding current regulating system comprising means for varying a supply of welding current, means responsive to said current according to the magnitude thereof for producing a control voltage, means operable to modify said control voltage according to a welding current schedule, a source of reference voltage, electronic means including a pair of triodes controlled respectively by said reference and modified voltages for selectively producing alternate sense control voltages and motive means controlled according to the sense of a selected control voltage for operating said current varying means so as to maintain welding current at the schedule value.

12. A welding current regulating system comprising means for varying a supply of welding current, means responsive to said current according to the magnitude thereof for producing a control voltage, means operable to vary an impedance according to a welding current schedule, means for relating said control voltage and said impedance so that said voltage is modified according to variation of said impedance, a source of reference voltage, electronic means controlled by said modified voltage for selectively producing alternate sense control voltages with respect to said reference voltage and means controlled by said electronic means according to the sense of a selected control voltage for operating said current varying means so as to maintain welding current at the schedule value.

13. A welding current regulating system comprising means for varying a supply of welding alternating current, a current transformer responsive to said current for producing a control voltage, means for varying an inductance operable according to a welding current schedule, a potential transformer energized by said control voltage, the secondary winding of said transformer being shunted by said inductance so that the secondary voltage is modified according to variation of said inductance, a source of reference voltage, electronic means controlled by said modified voltage for selectively producing alternate sense control voltages with respect to said reference voltage and means controlled according to the sense of a selected control voltage for operating said current varying means so as to maintain welding current at the schedule value.

14. In a regulating system in combination, primary members movable relative to one another along a scheduled path, variable means providing energy to said members during their relative movement to produce an effect thereon, said energy being required in different degree according to the position relation of said members, reversible means to alter the energy provided to said members, means responsive to the position relation of said members yielding a schedule signal proportional to the energy required at each position of said members relative to each other, means yielding an energy signal proportional to the actual energy provided by said variable means, means jointly controlled by said energy signal and said schedule signal for producing alternate sense control quantities with respect to a reference value, and means controlled by said controlled quantities according to the sense thereof for actuating said reversible power means so as to maintain the output of said variable energy means at the scheduled value.

15. In a regulating system in combination, primary members movable relative to one another along a scheduled path, variable means providing energy to said members during their relative movement to produce an effect thereon, said energy being required in different degree according to the position relation of said members, reversible power means to alter the energy provided to said members, a scheduling mechanism responsive to the position relation of said members to establish a desired schedule of energy output from said variable means, including means to modify a voltage manifestation in conformance to said schedule, a device producing a signal in the form of a voltage manifestation whose magnitude is a function of the instant energy output of said variable means, a source of reference voltage, a comparator upon which said reference voltage and said voltage manifestations are imposed, and means actuated by said comparator and responsive to unbalance between said reference voltage and said combined voltage manifestations to actuate said reversible power means to alter the energy output of said variable means.

ARTHUR W. STEINBERGER.

REFERENCES CITED

The following references are of record in the file of this patent:

UNITED STATES PATENTS

| Number | Name | Date |
| --- | --- | --- |
| 1,648,561 | Morton | Nov. 8, 1927 |
| 1,827,520 | Harrison | Oct. 13, 1931 |
| 2,083,190 | Dawson | June 8, 1937 |
| 2,145,010 | Kennedy et al. | Jan. 24, 1939 |
| 2,175,009 | Anderson | Oct. 3, 1939 |
| 2,175,026 | Jones | Oct. 3, 1939 |
| 2,192,312 | Holslag | Mar. 5, 1940 |
| 2,236,998 | Gillette | Apr. 1, 1941 |
| 2,239,768 | Artzt | Apr. 29, 1941 |
| 2,250,899 | Young | July 29, 1941 |
| 2,259,958 | Levy | Oct. 21, 1941 |
| 2,302,049 | Parker | Nov. 17, 1942 |
| 2,323,349 | Ocquist | July 6, 1943 |
| 2,325,232 | Davis | July 27, 1943 |
| 2,368,582 | Sziklai | Jan. 30, 1945 |